Nov. 21, 1950   A. R. SMITH   2,531,305
HOPPER VERTICALLY ADJUSTABLE FOR
SEALING CONTACT WITH COVER
Filed Jan. 13, 1948
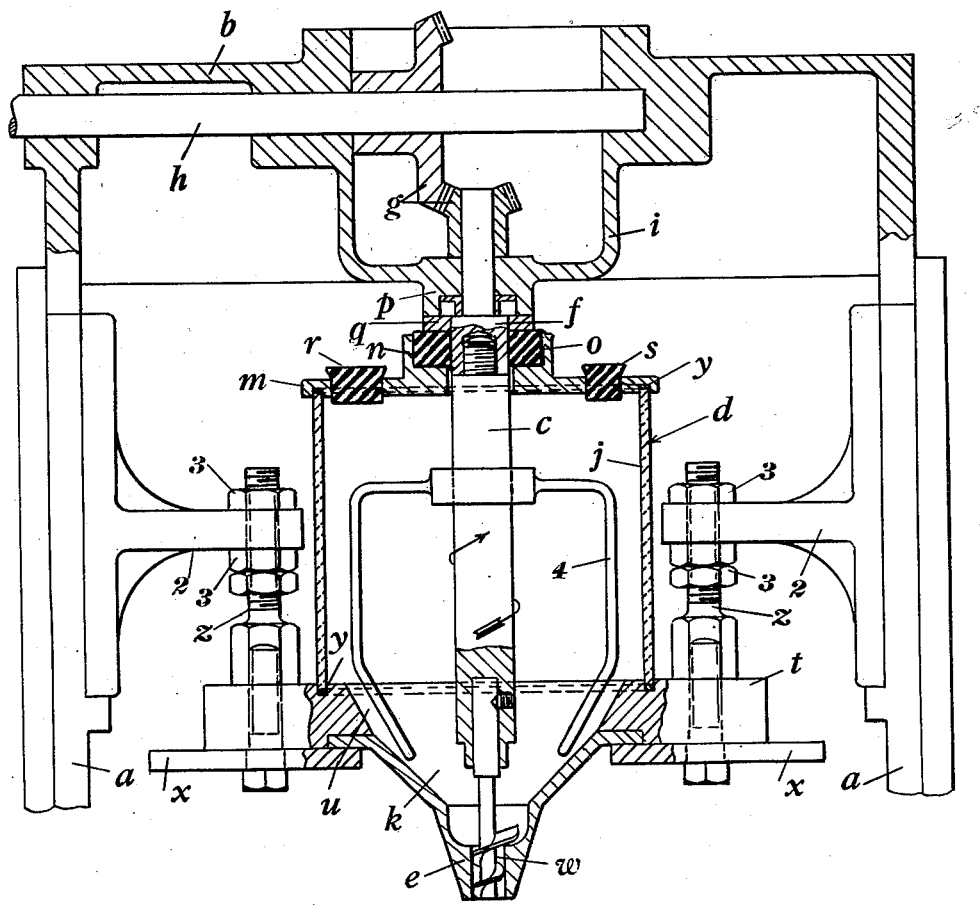
Inventor
A. R. Smith
By Glascock Downing Seebold
Attys Patented Nov. 21, 1950

2,531,305

UNITED STATES PATENT OFFICE 2,531,305

HOPPER VERTICALLY ADJUSTABLE FOR SEALING CONTACT WITH COVER

Arthur Ronald Smith, Birmingham, England

Application January 13, 1948, Serial No. 2,067
In Great Britain September 23, 1940

Section 1, Public Law 690, August 8, 1946
Patent expires September 23, 1960

4 Claims. (Cl. 222—413)

This invention relates to filling machines of the kind having a hopper from which powdered or like finely divided solid substances can be delivered to receptacles placed beneath the discharge orifice of the hopper, the object of the invention being to provide an improved machine adapted more particularly for dealing with powdered drugs, chemicals or the like which require to be contained in a closed hopper and which make it necessary or desirable that certain members of the machine shall be capable of being easily taken apart for cleaning or sterilizing purposes.

The accompanying drawing is a sectional elevation of a machine constructed in accordance with the invention for delivering powdered drugs, chemicals or the like in small quantities into ampules or other receptacles.

In carrying the invention into effect as shown, I employ any convenient frame-like body part having a pair of sides $a$ and an upper cross member $b$. Depending from the underside of the cross member $b$, at or about its centre, is a vertical rotary spindle $c$ which extends through a closed hopper $d$ and is provided or formed at its lower end with a worm $e$ for discharging powdered drugs, chemicals or like material from the hopper. At its upper end the spindle $c$ is in detachable screw-thread connection with an extension $f$ which is rotatably supported by the cross member $b$, and which is connected by bevel gearing $g$ to an intermittently rotatable driving shaft $h$, the latter being supported in a horizontal position by the cross member $b$ which is formed with a housing $i$ for accommodating the bevel gearing, and the said extension being arranged to pass through the base of the said housing.

The hopper $d$ comprises a vertically arranged glass or other hollow cylinder $j$, and a funnel $k$ at the lower end of the cylinder, the upper end of the cylinder being closed by a cover piece $m$. At or about its centre the cover piece $m$ is formed with a boss $n$ through which the spindle $c$ passes, and around the upper side of its aperture the boss is formed with a recess for accommodating an annular sealing washer $o$ of rubber or any other suitable material, the base of the housing $i$ above-mentioned being formed with a boss $p$ against which the upper face of the washer can be pressed, either directly or through the medium of another washer $q$, to form an air-tight joint for preventing escape of powder from the hopper $d$ past the upper portion of the spindle $c$. Also the cover piece $m$ is provided with an aperture which is closed by a removable cap or plug $r$, and through which the hopper $d$ can be charged. Moreover the cover piece $m$ may be provided with another aperture which is also closed by a removable cap or plug $s$, so that the two apertures may serve for the admission and discharge of gas when it is required to provide an atmosphere of inert or other special gas in the upper part of the hopper $d$. At its lower end the cylinder $j$ is supported on the upper side of a horizontal plate $t$ and around an aperture $u$ formed in the plate, the aperture being of slightly smaller diameter than the interior of the cylinder, and serving to establish communication between the interiors of the cylinder and the funnel $k$. At its lower end the funnel $k$ is provided with a discharge orifice $w$ in which the worm $e$ is located, and at its upper end the funnel is flanged or otherwise adapted to abut closely and in airtight manner against the underside of and around the aperture $u$ in the horizontal plate $t$. The funnel $k$ is held in position by a pair of hand levers $x$ pivotally mounted on the underside of the plate $t$. To minimize risk of leakage of the material from the hopper $d$ at the upper and lower ends of the cylinder $j$, the closure piece $m$ and the plate $t$ are recessed to accommodate the adjacent ends of the cylinder, and also to accommodate rubber or other sealing rings $y$ against which the said ends can bear.

The plate $t$ is detachably connected to the sides $a$ of the frame-like body part by vertical screw-threaded stems $z$ which are secured to the upper side of the plate, and which extend through holes in brackets 2 on the sides of the body part, the stems being adjustably secured to the brackets by nuts 3 on the upper ends of the stems.

When the parts above described are assembled the hopper cylinder $j$ is held securely in position by the plate $t$ and is subject to upward pressure from the plate which ensures the maintenance of the required tight joints around the ends of the cylinder and the upper end of the spindle $c$. Also the funnel $k$ is held tightly in position by its securing levers $x$. The only orifice open to the atmosphere is the discharge orifice $w$ at the lower end of the funnel $k$. On setting the machine in motion the powdered material is discharged by the worm $e$ through the orifice $w$ into ampules or other receptacles successively placed in position beneath the orifice. Preferably and as shown a stirrer 4 is mounted on the spindle $c$ within the hopper $d$.

When it is required to dismember the machine for cleaning or sterilizing, the funnel $k$ is detached from the plate $t$ which is then detached from its supporting brackets 2 and lowered, together with the cylinder $j$, into a position clear of the lower end of the spindle $c$ where the plate and cylinder can be separated from one another. The spindle $c$ can now be detached from its extension $f$, and thus from its driving means $g$, $h$. After cleaning or sterilizing re-assembly of the parts is effected by reversal of the above described sequence of actions.

By this invention the required enclosing of the material to be delivered to the receptacles, and the preventing of discharge or escape of the material excepting through the delivery orifice, and the rendering of the hopper and all associated parts easily separable for cleaning, are all effected in a very simple and convenient manner.

Having thus described my invention what I claim as new and desire to secure by Letters Patent is:

1. A filling machine of the kind specified, comprising in combination a frame-like body part having an upper cross member, a rotary spindle depending vertically from the cross member, a worm on the spindle, driving mechanism carried by the cross member for imparting rotary motion to the spindle, a hopper arranged beneath the cross member and provided with a supporting member, means for imparting vertical adjusting movement to the hopper through the medium of its supporting member, a cover piece closing the upper end of the hopper and provided with an aperture through which the spindle passes, and an annular sealing washer surrounding the spindle and compressible between the cover piece and cross member to form an air-tight seal between the spindle and cover piece in response to upward adjusting movement of the hopper.

2. A filling machine as claimed in claim 1 and having a detachable delivery funnel at the lower end of the hopper, and hand levers on the hopper-supporting member for releasably holding the funnel in position.

3. A filling machine as claimed in claim 1 and having fixed parts to which the hopper-supporting member is detachably secured by screw-and-nut mechanisms constituting the means for imparting vertical adjusting movement to the hopper.

4. A filling machine as claimed in claim 1, in which the hopper comprises in combination a vertical hollow cylinder which at its upper end is closed by the cover piece, a plate supporting the lower end of the cylinder and forming the hopper-supporting member, the plate being provided with an aperture which is surrounded by the lower end of the cylinder, a delivery funnel at the lower end of the cylinder, means on the plate for detachably holding the funnel in position, and sealing rings arranged at the ends of the cylinder so as to be compressible with the sealing washer associated with the spindle and cover piece.

ARTHUR RONALD SMITH.

REFERENCES CITED

The following references are of record in the file of this patent:

UNITED STATES PATENTS

| Number | Name | Date |
|---|---|---|
| 714,875 | Doble | Dec. 2, 1902 |
| 1,611,800 | Ziegner | Dec. 21, 1926 |
| 2,014,617 | Fischer | Sept. 17, 1935 |
| 2,244,718 | Long | June 10, 1941 |
| 2,330,862 | Bleam | Oct. 5, 1943 |